US012490019B2

(12) United States Patent
Nishida et al.

(10) Patent No.: US 12,490,019 B2
(45) Date of Patent: Dec. 2, 2025

(54) LOUDSPEAKER DEVICE

(71) Applicant: Panasonic Intellectual Property Management Co., Ltd., Osaka (JP)

(72) Inventors: Masashi Nishida, Osaka (JP); Kazuki Honda, Mie (JP); Ippei Kiyama, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 72 days.

(21) Appl. No.: 18/689,318

(22) PCT Filed: Aug. 9, 2022

(86) PCT No.: PCT/JP2022/030487

§ 371 (c)(1),
(2) Date: Mar. 5, 2024

(87) PCT Pub. No.: WO2023/105854

PCT Pub. Date: Jun. 15, 2023

(65) Prior Publication Data

US 2024/0397253 A1 Nov. 28, 2024

(30) Foreign Application Priority Data

Dec. 10, 2021 (JP) ................................ 2021-200842

(51) Int. Cl.
*H04R 1/02* (2006.01)
*H04R 1/28* (2006.01)

(52) U.S. Cl.
CPC ............. *H04R 1/2826* (2013.01); *H04R 1/02* (2013.01)

(58) Field of Classification Search
CPC ...... H04R 1/2826; H04R 1/02; H04R 1/2888; H04R 1/2819
See application file for complete search history.

(56) References Cited

U.S. PATENT DOCUMENTS 7,201,252 B2 4/2007 Nevill
2018/0242061 A1* 8/2018 Honda ..................... H04R 3/04
2020/0236462 A1* 7/2020 Kitagawa ............... G10K 11/20

FOREIGN PATENT DOCUMENTS

JP 2006-261735 A 9/2006
JP 2020-178336 A 10/2020
(Continued)

OTHER PUBLICATIONS

Augustin, Gerald F. "Diffuser For Loudspeakers Has A Diffuser Surface Area Structured In A Type Of Pattern Aligned To A Loudspeaker Membrane". Dec. 22, 2005 (Year: 2005).*
(Continued)

*Primary Examiner* — Brian Ensey
(74) *Attorney, Agent, or Firm* — Rimon P.C.

(57) ABSTRACT

A loudspeaker device includes: a loudspeaker unit; a cabinet that includes an opening and covers the rear side of the loudspeaker unit; a bass reflex port in a tubular shape that communicates the interior with the exterior of the cabinet, and includes one end disposed in the opening of the cabinet and the other end disposed inside the cabinet; and a diffuser in the shape of a mountain that includes a side surface in a substantially tapered shape, a top facing the one end of the bass reflex port, and a base edge located on the side of the side surface opposite to the top in the inclination direction of the side surface. The side surface of the diffuser includes a plurality of grooves spaced apart in the circumferential direction of the diffuser and each extending helically in a direction from the top to the base edge.

4 Claims, 13 Drawing Sheets

(56) References Cited

FOREIGN PATENT DOCUMENTS

| | | | |
|---|---|---|---|
| WO | 2003/026347 | A1 | 3/2003 |
| WO | 2017/038016 | A1 | 3/2017 |

OTHER PUBLICATIONS

International Search Report dated Oct. 25, 2022 issued in International Patent Application No. PCT/JP2022/030487, with English translation.

* cited by examiner

LOUDSPEAKER DEVICE

This application is the U.S. National Phase under 35 U.S.C. § 371 of International Patent Application No. PCT/JP2022/030487, filed on Aug. 9, 2022, which in turn claims the benefit of Japanese Patent Application No. 2021-200842, filed on Dec. 10, 2021, the entire disclosures of which Applications are incorporated by reference herein.

TECHNICAL FIELD

The present disclosure relates to a bass reflex loudspeaker device.

BACKGROUND ART

A bass reflex loudspeaker device including a bass reflex port installed downward and called a down-firing system is known (for example, see Patent Literature (PTL) 1). This type of loudspeaker device includes a cabinet, a loudspeaker unit, and a bass reflex port. The cabinet is disposed to cover the rear side of the loudspeaker unit. The bass reflex port is formed in a cylindrical shape and communicates the interior of the cabinet with the exterior of the cabinet. One end of the bass reflex port is disposed in an opening formed in the bottom surface of the cabinet, and the other end of the bass reflex port is disposed inside the cabinet.

In this type of loudspeaker device, when bass is emitted from the rear side of the loudspeaker unit to the interior space of the cabinet, bass with the same phase as that on the front side of the loudspeaker unit is emitted downward from one end of the bass reflex port to the exterior of the cabinet due to Helmholtz resonance inside the bass reflex port. Thereby, the reproduction of the bass can be enhanced. However, when the sound emitted from the bass reflex port is reflected off the floor surface, the reflected sound and the direct sound emitted from the bass reflex port interfere with each other to generate a disturbance in sound waves, which causes a problem of degraded sound quality.

To solve such a problem, this type of loudspeaker device is further equipped with a diffuser. The diffuser is formed in a substantially conical shape, and is disposed so that its top faces the one end of the bass reflex port. The sound emitted from the bass reflex port is diffused in all directions along the side surface of the diffuser. It is thus possible to inhibit the interference between the reflected sound and the direct sound described above and enhance sound quality.

CITATION LIST

Patent Literature

[PTL1] Japanese Unexamined Patent Application Publication No. 2006-261735

SUMMARY OF INVENTION

Technical Problem

The present disclosure provides a loudspeaker device that can further enhance sound quality.

Solution to Problem

A loudspeaker device in the present disclosure includes: a loudspeaker unit that converts an electric signal into vibration to emit sound; a cabinet that includes an opening and covers a rear side of the loudspeaker unit; a bass reflex port in a tubular shape that communicates an interior of the cabinet with an exterior of the cabinet, and includes one end disposed in the opening of the cabinet and the other end disposed inside the cabinet; and a diffuser in the shape of a mountain that includes a side surface in a substantially tapered shape, a top facing the one end of the bass reflex port, and a base edge located on a side of the side surface that is opposite to the top in an inclination direction of the side surface. The side surface of the diffuser includes a plurality of grooves that are spaced apart in a circumferential direction of the diffuser and each extend helically in a direction from the top to the base edge.

Advantageous Effects of Invention

According to the loudspeaker device in the present disclosure, sound quality can be further enhanced.

DESCRIPTION OF EMBODIMENTS

Embodiments will be described in detail below with reference to the drawings as appropriate. However, a description detailed more than necessary may be omitted. For example, a detailed description of a well-known matter or a duplicate description for a substantially identical configuration may be omitted. This is to avoid unnecessary redundancy in the following description and to facilitate the understanding of those skilled in the art.

Note that the inventors provide the accompanying drawings and the following description to enable those skilled in the art to fully understand the present disclosure, and do not intend that these limit the subject matter recited in the claims.

Embodiment 1

Figure 1:
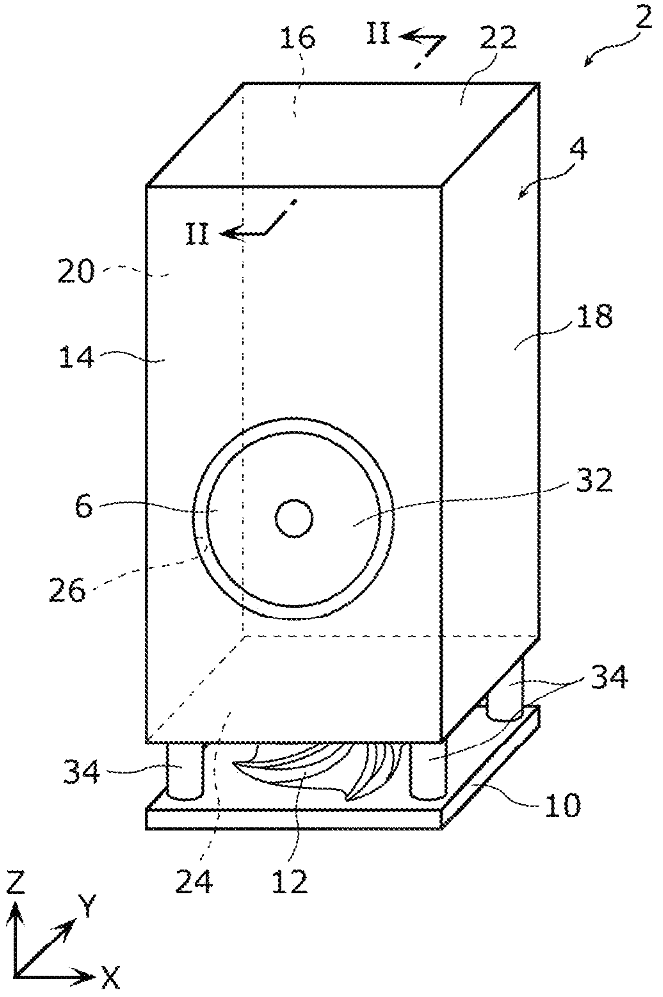
FIG. 1 is a perspective view illustrating a loudspeaker device according to Embodiment 1.
Figure 2:
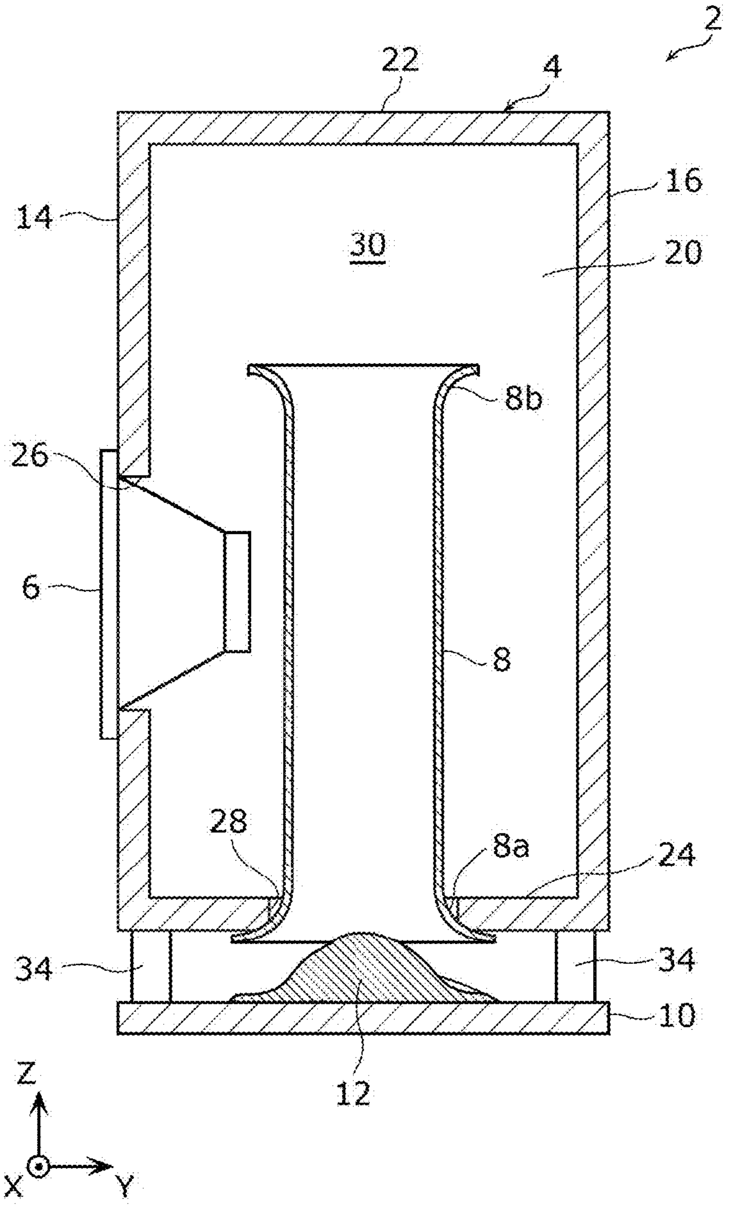
FIG. 2 is a cross-sectional view of the loudspeaker device according to Embodiment 1 taken along line II-II of FIG. 1.

Embodiment 1 will be described below with reference to FIGS. 1 to 13. In FIGS. 1 and 2, the left-right direction of loudspeaker device 2 is defined as the X-axis direction, the front-rear direction of loudspeaker device 2 is defined as the Y-axis direction, and the vertical direction of loudspeaker device 2 is defined as the Z-axis direction.

1. Configuration of Loudspeaker Device

First, the configuration of loudspeaker device 2 according to Embodiment 1 will be described with reference to FIGS. 1 and 2. FIG. 1 is a perspective view illustrating loudspeaker device 2 according to Embodiment 1. FIG. 2 is a cross-sectional view of loudspeaker device 2 according to Embodiment 1 taken along line II-II of FIG. 1.

As illustrated in FIGS. 1 and 2, loudspeaker device 2 includes cabinet 4, loudspeaker unit 6, bass reflex port 8, support board 10, diffuser 12, and four column members 34. Loudspeaker device 2 is a bass reflex loudspeaker device called a down-firing system, in which bass reflex port 8 is installed downward (in the negative direction of the Z-axis).

Cabinet 4 is a housing (enclosure) disposed to cover the rear side of loudspeaker unit 6. Cabinet 4 is formed in a substantially rectangular parallelepiped shape and includes front panel 14, rear panel 16, right side panel 18, left side panel 20, top panel 22, and bottom panel 24. Front panel 14 and rear panel 16 are arranged facing each other in the front-rear direction (Y-axis direction). Right side panel 18 and left side panel 20 are arranged facing each other in the left-right direction (X-axis direction). Top panel 22 and bottom panel 24 are arranged facing each other in the vertical direction (Z-axis direction). In front panel 14, circular opening 26 for disposing loudspeaker unit 6 is formed. In bottom panel 24, circular opening 28 for disposing one end 8*a* of bass reflex port 8 is formed. Inside cabinet 4, interior space 30 is formed surrounded by front panel 14, rear panel 16, right side panel 18, left side panel 20, top panel 22, and bottom panel 24.

Loudspeaker unit 6 includes diaphragm 32 formed in the shape of a cone, and converts an electric signal (audio signal) supplied from an amplifier (not illustrated) into vibration of diaphragm 32 to generate sound. Loudspeaker unit 6 is disposed at opening 26 in front panel 14 of cabinet 4.

Bass reflex port 8 serves to communicate the interior of cabinet 4 with the exterior of cabinet 4, and is formed in a substantially cylindrical shape. One end 8*a* of bass reflex port 8 is formed in a flare shape with its diameter gradually increasing to the open end, and is disposed in opening 28 in bottom panel 24 of cabinet 4. Other end 8*b* of bass reflex port 8 is formed in a flare shape with its diameter gradually increasing to the open end, and is disposed in interior space 30 of cabinet 4. That is, bass reflex port 8 extends upward (in the positive direction of the Z-axis) from opening 28 in bottom panel 24 of cabinet 4 toward interior space 30 of cabinet 4.

Support board 10 serves to support diffuser 12 and is formed in a rectangular plate shape. Support board 10 is disposed facing the lower surface (the surface opposite to interior space 30) of bottom panel 24 of cabinet 4, and is connected to bottom panel 24 of cabinet 4 via four column members 34. Four column members 34 are arranged at the four corners of support board 10 to surround diffuser 12. Although four column members 34 have been provided in the present embodiment, the present invention is not limited thereto, and any number of column members 34 may be provided.

Diffuser 12 serves to control the flow of air discharged from one end 8*a* of bass reflex port 8 to the exterior of cabinet 4 and the flow of air drawn from the exterior of cabinet 4 to one end 8*a* of bass reflex port 8. Diffuser 12 is supported on the upper surface (the surface on the side facing bottom panel 24) of support board 10. Diffuser 12 is made by, for example, (a) cutting of wood, (b) injection molding of resin, or (c) casting, forging, or press molding of metal.

In bass reflex loudspeaker device 2 described above, when bass is emitted from the rear side of loudspeaker unit 6 to interior space 30 of cabinet 4, bass with the same phase as that on the front side of loudspeaker unit 6 is emitted downward from one end 8*a* of bass reflex port 8 to the exterior of cabinet 4 due to Helmholtz resonance inside bass reflex port 8. Thereby, the reproduction of the bass can be enhanced.

2. Configuration of Diffuser

Figure 3:
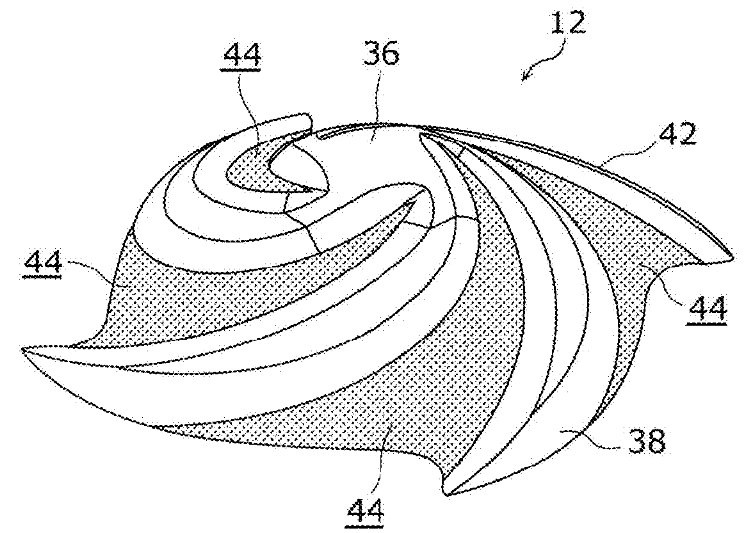
FIG. 3 is a perspective view illustrating a diffuser according to Embodiment 1.
Figure 4:
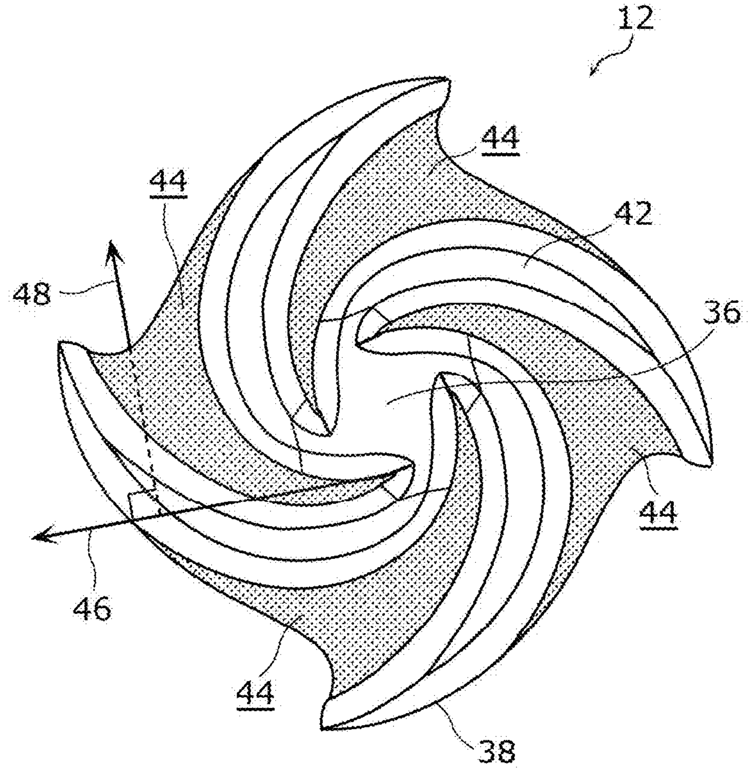
FIG. 4 is a plan view illustrating the diffuser according to Embodiment 1.
Figure 5:
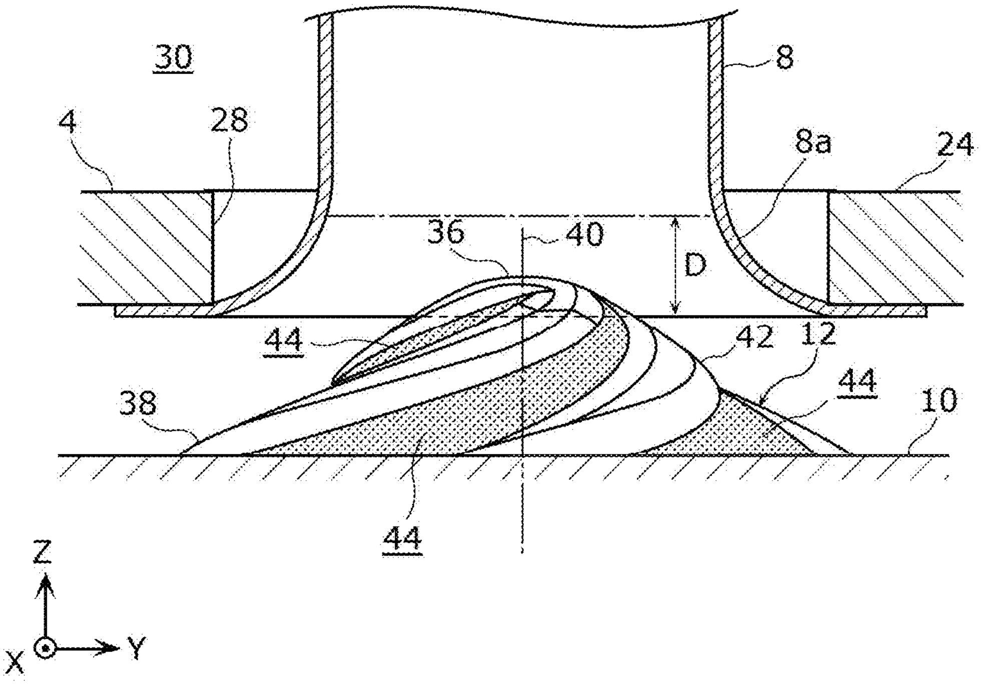
FIG. 5 is a side view illustrating the diffuser according to Embodiment 1.

Next, the configuration of diffuser 12 according to Embodiment 1 will be described with reference to FIGS. 3 to 5. FIG. 3 is a perspective view illustrating diffuser 12 according to Embodiment 1. FIG. 4 is a plan view illustrating diffuser 12 according to Embodiment 1. FIG. 5 is a side view illustrating diffuser 12 according to Embodiment 1.

As illustrated in FIGS. 3 to 5, diffuser 12 is formed in the shape of a mountain (including a substantially conical shape) that includes top 36, base edge 38, and side surface 42. As illustrated in FIG. 5, side surface 42 of diffuser 12 is formed in a substantially linear taper shape. Top 36 of diffuser 12 is formed in a rounded curved surface shape, and is disposed facing one end 8*a* of bass reflex port 8. Although top 36 of diffuser 12 has been formed in a curved shape in the present embodiment, the present invention is not limited thereto, and top 36 may be formed in a shape with a sharp tip. Base edge 38 of diffuser 12 is located on the side of side surface 42 that is opposite to top 36 in the inclination direction of side surface 42, and is supported on the upper surface of support board 10. That is, base edge 38 of diffuser 12 extends radially outward from axis 40 (see FIG. 5) passing through top 36. Note that the inclination direction of side surface 42 is a direction in which side surface 42 is inclined with respect to axis 40 passing through top 36.

A plurality of (four in the present embodiment) concave grooves 44 are formed in side surface 42 of diffuser 12. In FIGS. 3 to 5, a halftone dot pattern is applied to each of the plurality of grooves 44 for clear illustration. The plurality of grooves 44 are arranged at regular intervals in the circumferential direction of diffuser 12 and each extend helically from top 36 to base edge 38. Note that the circumferential direction of diffuser 12 means a circumferential direction around axis 40 passing through top 36 of diffuser 12. The width (the size in a direction intersecting with the extending direction) of each of the plurality of grooves 44 gradually increases from top 36 to base edge 38.

Although concave groove 44 has been formed in side surface 42 of diffuser 12 in the present embodiment, the present invention is not limited thereto, and a pair of protrusions extending helically in the direction from top 36 to base edge 38 may be formed in side surface 42 of diffuser 12. In this case, the space between the pair of protrusions corresponds to a groove.

As illustrated in FIG. 4, in the present embodiment, the helix angle of each of the plurality of grooves 44 (the angle formed by vector 46, which indicates the orientation of the starting point of groove 44, and vector 48, which indicates the orientation of the ending point of groove 44) is about 90°. Note that the helix angle of each groove 44 is preferably 90°±30°, more preferably 90°±20°, and most preferably 90°±#10°, regardless of the number of grooves 44.

As illustrated in FIG. 5, top 36 of diffuser 12 preferably protrudes into the interior of bass reflex port 8 through one end 8*a* of bass reflex port 8 to sufficiently obtain an effect to be described later. In this case, top 36 of diffuser 12 may be disposed within range D of the flared portion at one end 8*a* of bass reflex port 8, or may be disposed inside the straight tube portion of bass reflex port 8. More preferably, top 36 of diffuser 12 is disposed in the lower half of range D described above (i.e., closer to the opening end of one end 8*a* of bass reflex port 8 than the center of range D). Note that top 36 of diffuser 12 may be disposed outside bass reflex port 8.

3. Function of Diffuser

Figure 6:
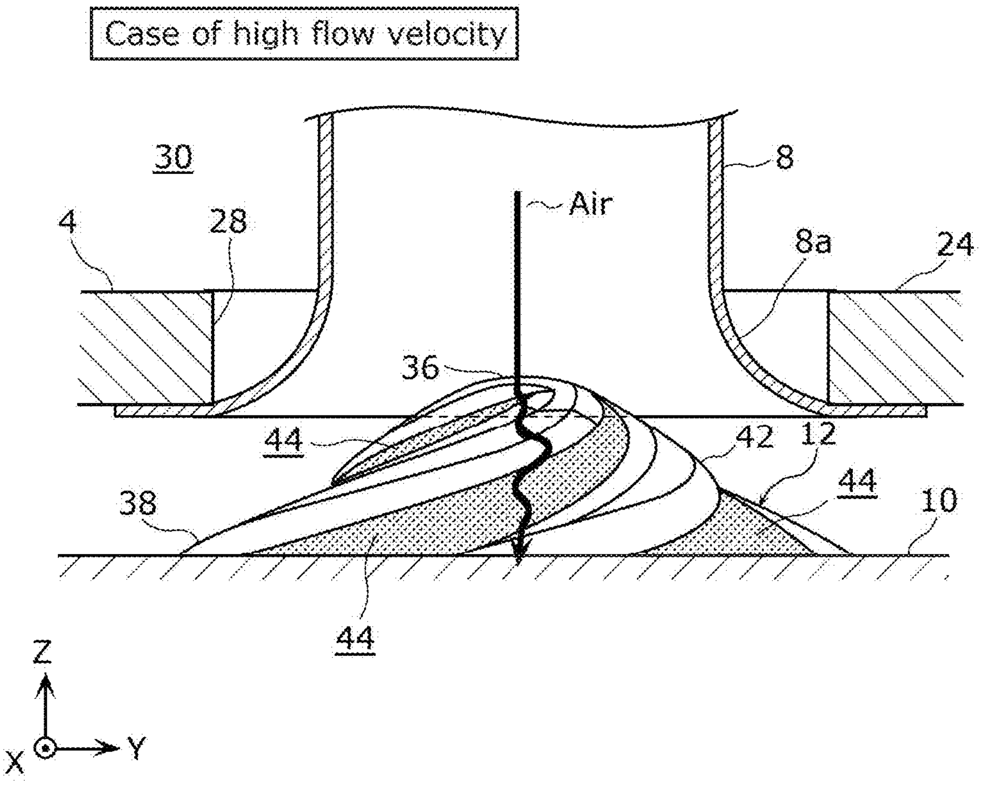
FIG. 6 is a diagram illustrating the flow of air controlled by the diffuser according to Embodiment 1 when the flow velocity of the air is high.
Figure 7:
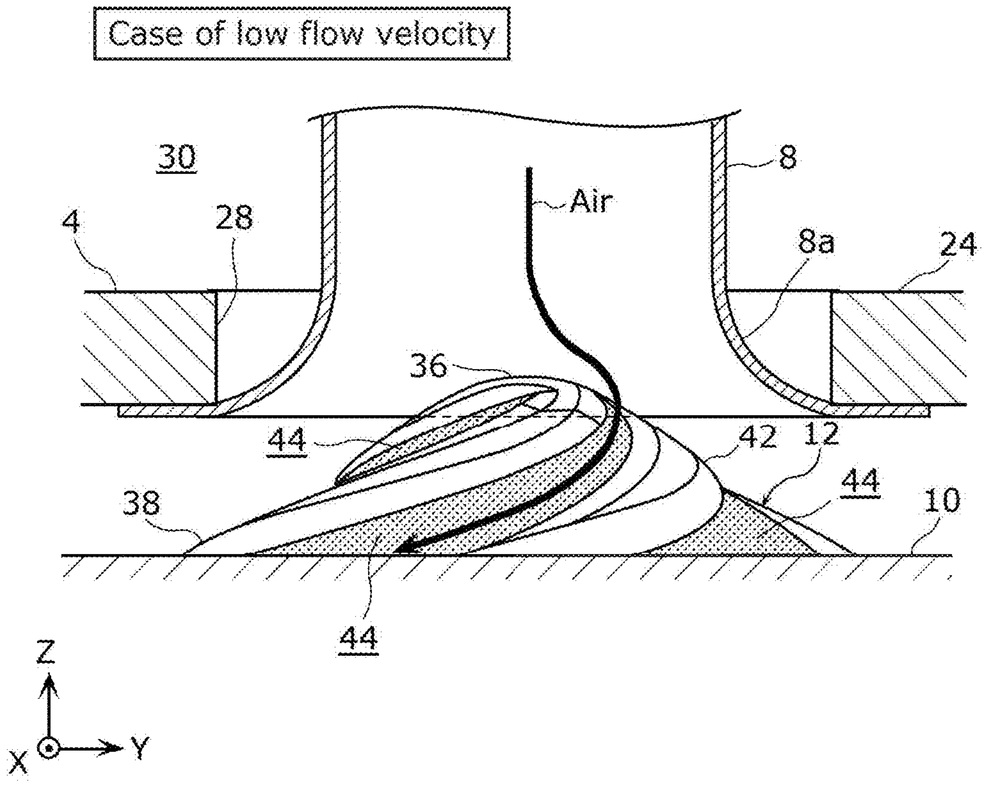
FIG. 7 is a diagram illustrating the flow of air controlled by the diffuser according to Embodiment 1 when the flow velocity of the air is low.

The function of diffuser 12 according to Embodiment 1 will be described with reference to FIGS. 6 and 7. FIG. 6 is a diagram illustrating the flow of air controlled by diffuser 12 according to Embodiment 1 when the flow velocity of the air is high. FIG. 7 is a diagram illustrating the flow of air controlled by diffuser 12 according to Embodiment 1 when the flow velocity of the air is low.

As diaphragm 32 of loudspeaker unit 6 vibrates, a suction operation, in which the air outside cabinet 4 is sucked into interior space 30 of cabinet 4 via bass reflex port 8, and a discharge operation, in which the air in interior space 30 of cabinet 4 is discharged to the exterior of cabinet 4 via bass reflex port 8, are alternately repeated.

As illustrated in FIG. 6, when the flow velocity of the air discharged from bass reflex port 8 to the exterior of cabinet 4 and the flow velocity of the air drawn into bass reflex port 8 from the exterior of cabinet 4 are relatively high, the air flows from top 36 of diffuser 12 along a direction intersecting with the respective extending directions of the plurality of grooves 44. At this time, a moderate disturbance occurs in the air that flows along the direction intersecting with the respective extending directions of the plurality of grooves 44, and a small vortex occurs in the mid-abdomen portion of side surface 42 of diffuser 12 (a portion between top 36 and base edge 38). By intentionally causing a small vortex to occur in the mid-abdomen portion of side surface 42 of diffuser 12 in this manner, it is possible to inhibit the occurrence of a large vortex at base edge 38 and to avoid the generation of abnormal noise (wind noise) caused by the large vortex.

Further, as illustrated in FIG. 7, when the flow velocity of the air discharged from bass reflex port 8 to the exterior of cabinet 4 and the flow velocity of the air drawn into bass reflex port 8 from the exterior of cabinet 4 are relatively low, the air in the discharge operation described above flows helically from top 36 of diffuser 12 toward base edge 38 along the respective extending directions of the plurality of grooves 44. Thereby, the air discharged from bass reflex port 8 to the exterior of cabinet 4 efficiently diffuses in all directions along the respective extending directions of the plurality of grooves 44 of diffuser 12. On the other hand, the air in the suction operation described above flows helically from base edge 38 of diffuser 12 toward top 36 along the respective extending directions of the plurality of grooves 44. Thereby, the air drawn into bass reflex port 8 from the exterior of cabinet 4 converges along the respective extending directions of the plurality of grooves 44 of diffuser 12. As a result, it is possible to inhibit the disturbance in sound waves caused by the interference between the reflected sound and the direct sound as described in Background Art, and it is possible to enhance sound quality.

4. Effects

Loudspeaker device 2 according to a first aspect of the present disclosure includes: loudspeaker unit 6 that converts an electric signal into vibration to emit sound; cabinet 4 that includes opening 28 and covers the rear side of loudspeaker unit 6; bass reflex port 8 in a tubular shape that communicates the interior of cabinet 4 with the exterior of cabinet 4, and includes one end 8*a* disposed in opening 28 of cabinet 4 and other end 8*b* disposed in interior space 30 of cabinet 4; and diffuser 12 in the shape of a mountain that includes side surface 42 in a substantially tapered shape, top 36 facing one end 8*a* of bass reflex port 8, and base edge 38 located on the side of side surface 42 that is opposite to top 36 in the inclination direction of side surface 42. A plurality of grooves 44 are formed in side surface 42 of diffuser 12. Grooves 44 are spaced apart in the circumferential direction of diffuser 12 and each extend helically in a direction from top 36 to base edge 38.

With this configuration, since the plurality of grooves 44 are formed in side surface 42 of diffuser 12, as described above, the flow of the air into and out of bass reflex port 8 can be effectively controlled with the plurality of grooves 44. As a result, sound quality can be further enhanced compared to the diffuser having a substantially conical shape with no groove formed in its side surface as described in Background Art.

Loudspeaker device 2 according to a second aspect of the present disclosure is the loudspeaker device according to the first aspect in which the width of each of the plurality of grooves 44 gradually increases from top 36 to base edge 38.

With this configuration, when the air discharged from bass reflex port 8 to the exterior of cabinet 4 flows helically along the respective extending directions of the plurality of grooves 44, the air can be efficiently diffused in all directions. Further, when the air drawn into bass reflex port 8 from the exterior of cabinet 4 flows helically along the respective extending directions of the plurality of grooves 44, the air can be converged efficiently.

Loudspeaker device 2 according to a third aspect of the present disclosure is the loudspeaker device according to the first or second aspect in which the plurality of grooves 44 are arranged at equal intervals in the circumferential direction of diffuser 12.

With this configuration, when the air discharged from bass reflex port 8 to the exterior of cabinet 4 flows helically along the plurality of grooves 44, the air can be efficiently diffused in all directions. Further, when the air drawn into bass reflex port 8 from the exterior of cabinet 4 flows helically along the respective extending directions of the plurality of grooves 44, the air can be converged efficiently.

Loudspeaker device 2 according to a fourth aspect of the present disclosure is the loudspeaker device according to any one of the first to third aspects in which top 36 of diffuser 12 protrudes into the interior of bass reflex port 8 through one end 8*a* of bass reflex port 8.

With this configuration, the air discharged from bass reflex port 8 to the exterior of cabinet 4 can be effectively brought into contact with the plurality of grooves 44 of diffuser 12. Further, the air drawn into bass reflex port 8 from the exterior of cabinet 4 can be effectively converged into the interior of bass reflex port 8.

5. Example and Comparative Examples

The following Experiments 1 to 3 were performed to confirm the effect of the present embodiment, that is, the effect of further enhancing sound quality.

5-1. Experiment 1

Figure 8:
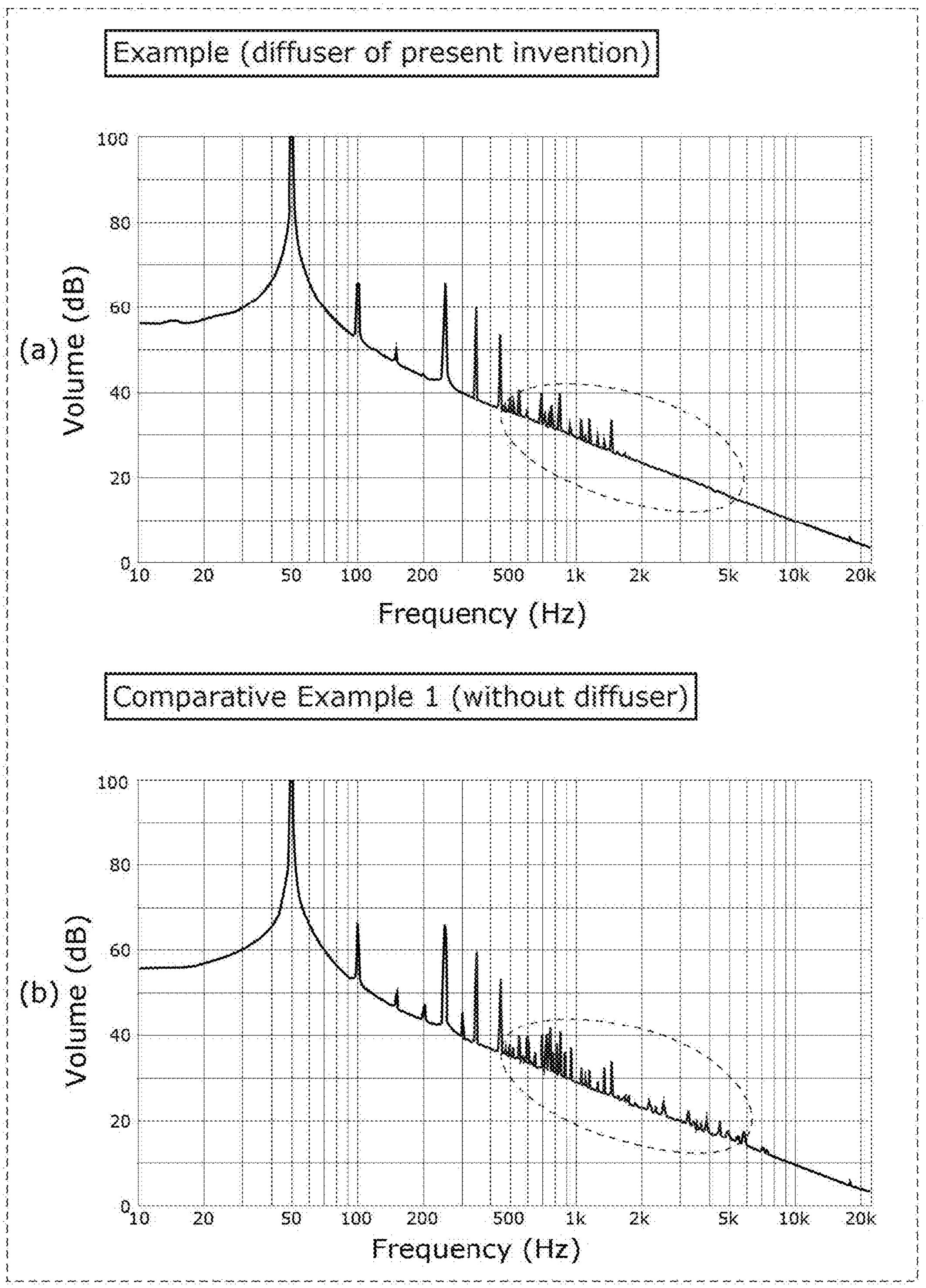
FIG. 8 is a graph illustrating frequency characteristics in Example and Comparative Example 1.
Figure 9:
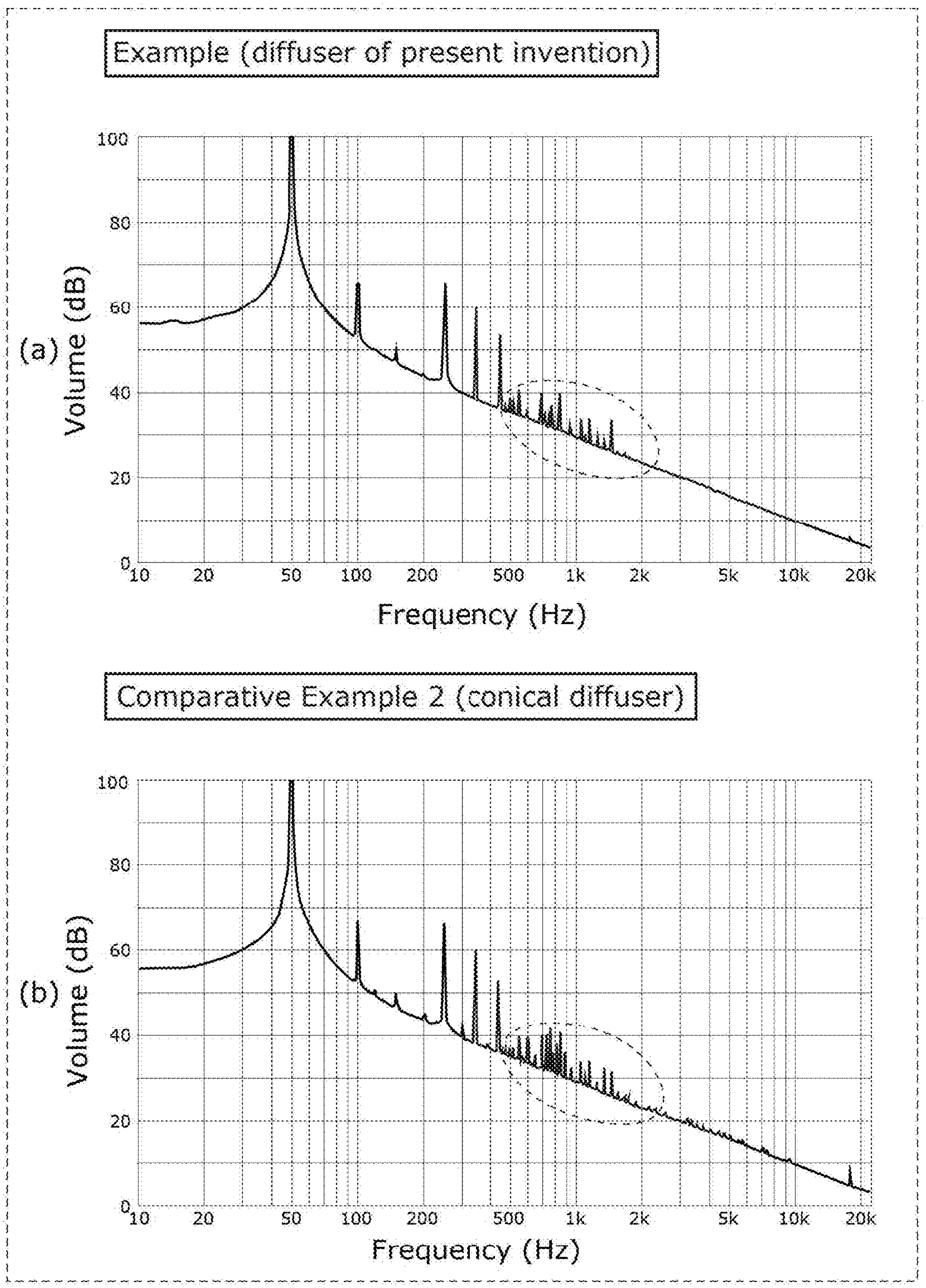
FIG. 9 is a graph illustrating frequency characteristics in Example and Comparative Example 2.

First, Experiment 1 will be described with reference to FIGS. 8 and 9. In Experiment 1, the influence of the presence or absence of the diffuser and the influence of the difference in the shape of the diffuser on a frequency characteristic were evaluated. FIG. 8 is a graph illustrating frequency characteristics in Example and Comparative Example 1. FIG. 9 is a graph illustrating frequency characteristics in Example and Comparative Example 2. In each of the graphs illustrated in FIGS. 8 and 9, the horizontal axis represents frequency (Hz), and the vertical axis represents volume (dB).

As Example, loudspeaker device 2 with diffuser 12 according to Embodiment 1 was used to evaluate a frequency characteristic when a sine wave of 50 Hz was reproduced.

As Comparative Example 1, a loudspeaker device without a diffuser was used to evaluate a frequency characteristic when a sine wave of 50 Hz was reproduced.

As Comparative Example 2, a diffuser having a substantially conical shape with no groove formed in its side surface was used to evaluate a frequency characteristic when a sine wave of 50 Hz was reproduced.

The experimental results of the frequency characteristics in Example and Comparative Examples 1 and 2 were as illustrated in FIGS. 8 and 9. (a) in FIG. 8 is a graph illustrating the frequency characteristic in Example, and (b) in FIG. 8 is a graph illustrating the frequency characteristic in Comparative Example 1. When these two graphs were compared, it was found that in the range of 500 Hz to 6 kHz, the harmonic component (the portion surrounded by the dashed line in each of (a) and (b) in FIG. 8) is kept lower in Example than Comparative Example 1.

(a) in FIG. 9 is a graph illustrating the frequency characteristic in Example, and (b) in FIG. 9 is a graph illustrating the frequency characteristic in Comparative Example 2. When these two graphs were compared, it was found that in the range of 500 Hz to 2 kHz, the harmonic component (the portion surrounded by the dashed line in each of (a) and (b) in FIG. 9) is kept lower in Example than in Comparative Example 2.

From the above, it was confirmed that by mounting diffuser 12 according to Embodiment 1 in loudspeaker device 2, the harmonic component can be kept low, so that the effect of further enhancing sound quality can be obtained.

5-2. Experiment 2

Figure 10:
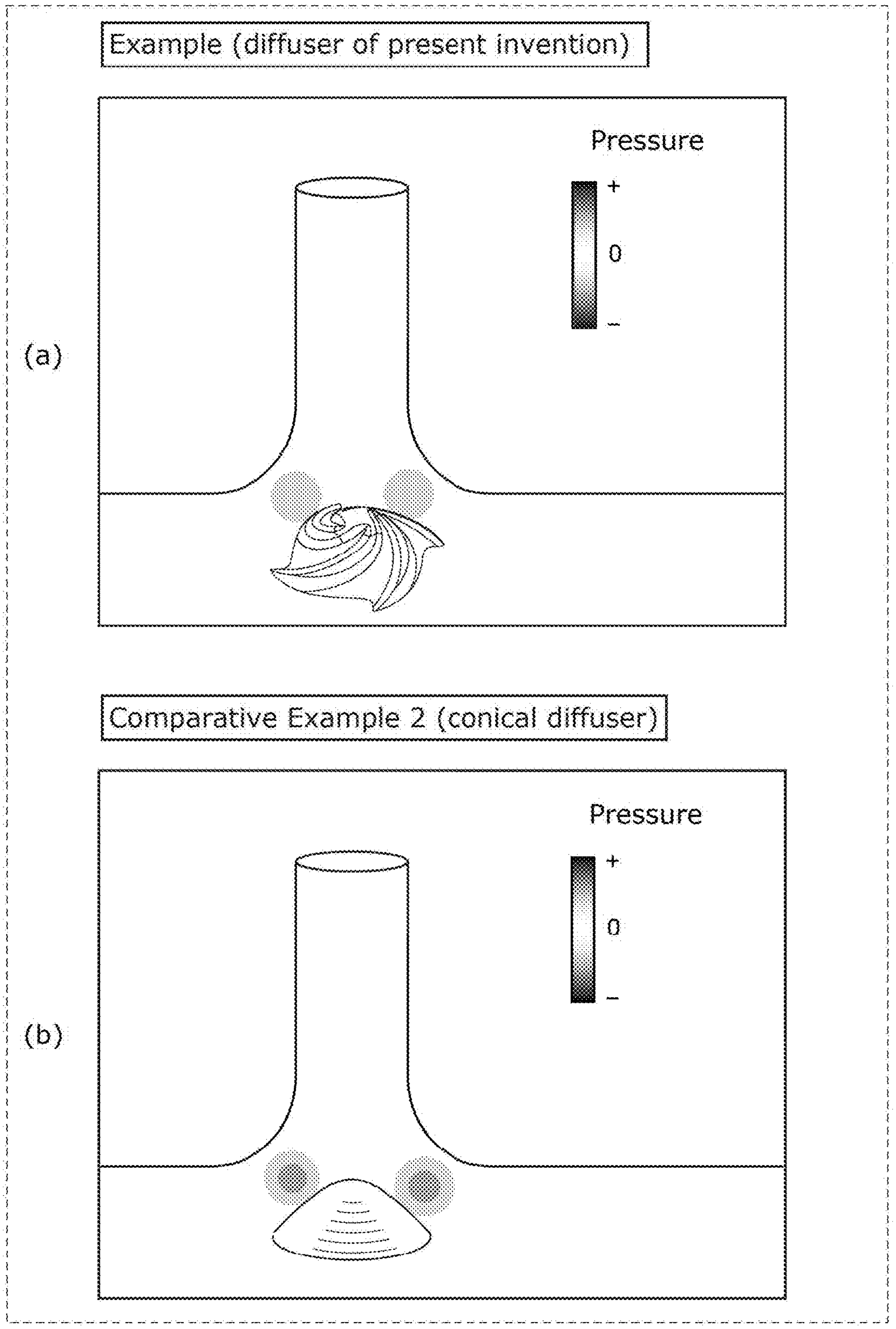
FIG. 10 is a diagram illustrating pressure distributions in Example and Comparative Example 2.

Experiment 2 will be described with reference to FIG. 10. In Experiment 2, the influence of the difference in the shape of the diffuser on a pressure distribution was evaluated when the frequency of the air reciprocating inside the bass reflex port was set to 50 Hz. FIG. 10 is a diagram illustrating pressure distributions in Example and Comparative Example 2. In FIG. 10, the greater the absolute value of the pressure, the darker the pressure is represented by color. For convenience of description, FIG. 10 illustrates only the major pressure distribution in which the difference in pressure distribution between Example and Comparative Example 2 is clear.

As Example, loudspeaker device 2 with diffuser 12 according to Embodiment 1 was used to evaluate a pressure distribution.

As Comparative Example 2, a diffuser having a substantially conical shape with no groove formed in its side surface was used to evaluate a pressure distribution.

The simulation results of the pressure distributions in Example and Comparative Example 2 were as illustrated in FIG. 10. Note that FIG. 10 illustrates a state at the moment when the gradient of the pressure distribution near the outlet of the bass reflex port is at its maximum (that is, when the abnormal noise is loudest). (a) in FIG. 10 is a diagram illustrating the simulation result of the pressure distribution in Example, and (b) in FIG. 10 is a diagram illustrating the simulation result of the pressure distribution in Comparative Example 2. When these two simulation results were compared, it was found that the disturbance in the pressure distribution near the outlet of the bass reflex port is less in Example than in Comparative Example 2.

From the above, the following is confirmed: by mounting diffuser 12 according to Embodiment 1 in loudspeaker device 2, the disturbance in the pressure distribution at one end 8*a* of bass reflex port 8 is reduced, enabling air resistance to be kept low and the generation of abnormal noise (wind noise) to be inhibited. It is thus possible to obtain the effect of further enhancing sound quality.

5-3. Experiment 3

Figure 11:
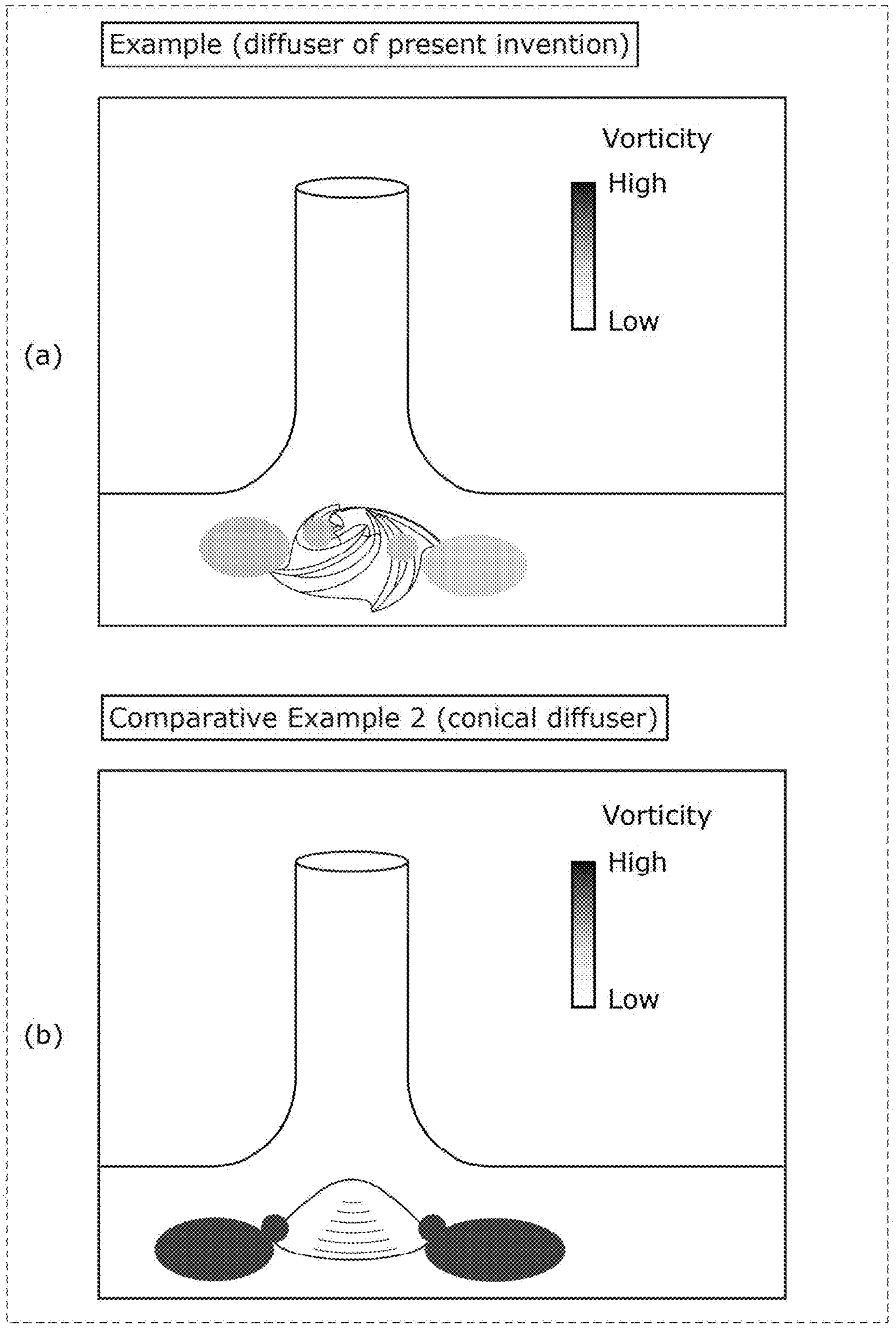
FIG. 11 is a diagram illustrating vorticity distributions in Example and Comparative Example 2.

Experiment 3 will be described with reference to FIG. 11. In Experiment 3, the influence of the difference in the shape of the diffuser on a vorticity distribution was evaluated when the frequency of the air reciprocating inside the bass reflex port was set to 50 Hz. FIG. 11 is a diagram illustrating vorticity distributions in Example and Comparative Example 2. In FIG. 11, the higher the vorticity, the darker the vorticity is represented by color. For convenience of description, in FIG. 11 illustrates only the major vorticity distribution in which the difference in vorticity distribution between Example and Comparative Example 2 is clear.

As Example, loudspeaker device 2 with diffuser 12 according to Embodiment 1 was used to evaluate a vorticity distribution.

As Comparative Example 2, a diffuser having a substantially conical shape with no groove formed in its side surface was used to evaluate a vorticity distribution.

The vorticity distributions in Example and Comparative Example 2 were as illustrated in FIG. 11. (a) in FIG. 11 is a diagram illustrating the simulation result of the vorticity distribution in Example, and (b) in FIG. 11 is a diagram illustrating the simulation result of the vorticity distribution in Comparative Example 2. When these two simulation results were compared, it was found that in Example, a small vortex has occurred in the mid-abdomen portion of side surface 42 of diffuser 12 and a medium vortex has occurred at base edge 38 of diffuser 12, whereas in Comparative Example 2, a small vortex has not occurred in the mid-abdomen portion of the side surface of the diffuser, and a large vortex has occurred at the base edge of the diffuser.

From the above, it was found that in the diffuser according to Comparative Example 2, a larger vortex occurs at the base edge because a small vortex does not occur in the mid-abdomen portion of the side surface, whereas in diffuser 12 according to Embodiment 1, a larger vortex is less likely to occur at base edge 38 because a small vortex occurs in the mid-abdomen portion of side surface 42 at a relatively early stage. As a result, the generation of abnormal noise (wind noise) caused by a large vortex can be inhibited, and it is thus confirmed that the effect of further enhancing sound quality can be obtained.

6. Variations of Diffuser

6-1. Variation 1

Figure 12:
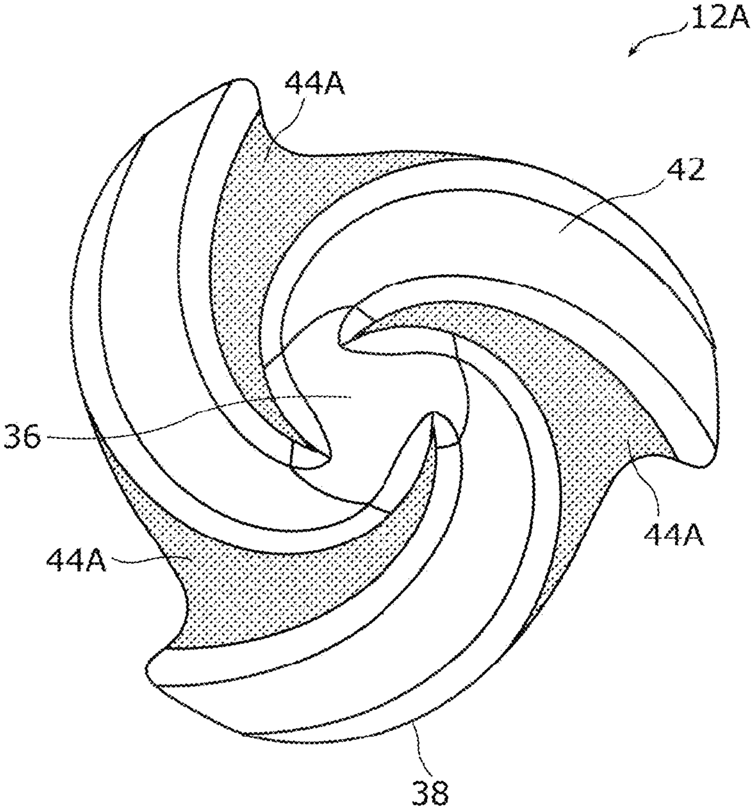
FIG. 12 is a plan view illustrating a diffuser according to Variation 1 of Embodiment 1.

A configuration of diffuser 12A according to Variation 1 of Embodiment 1 will be described with reference to FIG. 12. FIG. 12 is a plan view illustrating diffuser 12A according to Variation 1 of Embodiment 1.

As illustrated in FIG. 12, in diffuser 12A according to Variation 1, three grooves 44A are formed in side surface 42 of diffuser 12A. In FIG. 12, a halftone dot pattern is applied to each groove 44A for clear illustration. Three grooves 44A are arranged at regular intervals in the circumferential direction of diffuser 12A and each extend helically in a direction from top 36 to base edge 38. The helix angle of each of three grooves 44A is, for example, about 90°. Although the helix angle is set to about 90° in the present variation, this helix angle is an example and can be set to any angle. With this configuration as well, a similar effect to the one described above can be obtained.

6-2. Variation 2

Figure 13:
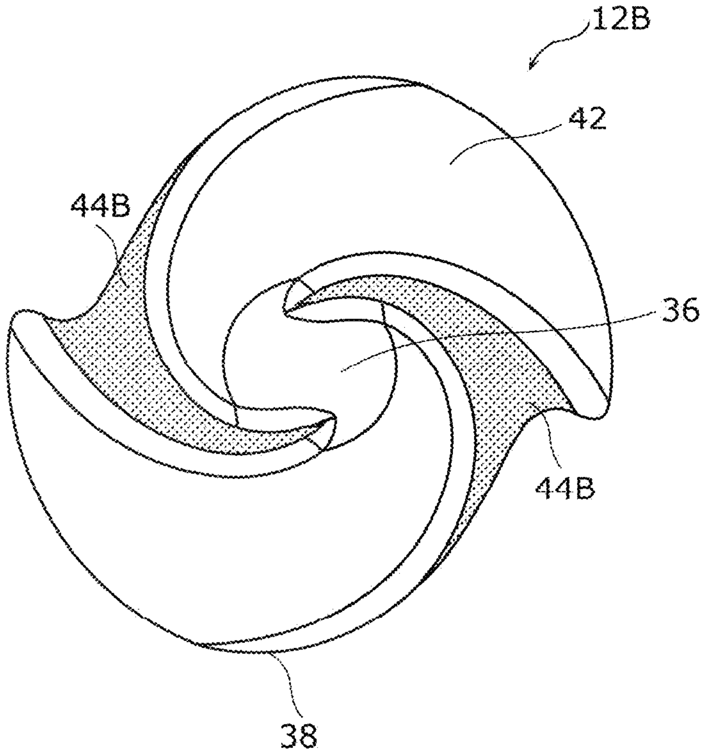
FIG. 13 is a plan view illustrating a diffuser according to Variation 2 of Embodiment 1.

A configuration of diffuser 12B according to Variation 2 of Embodiment 1 will be described with reference to FIG. 13. FIG. 13 is a plan view illustrating diffuser 12B according to Variation 2 of Embodiment 1.

As illustrated in FIG. 13, in diffuser 12B according to Variation 2, two grooves 44B are formed in side surface 42 of diffuser 12B. In FIG. 13, a halftone dot pattern is applied to each groove 44B for clear illustration. Two grooves 44B are arranged at equal intervals in the circumferential direction of diffuser 12B and each extend helically in a direction from top 36 to base edge 38. The helix angle of each of two grooves 44B is, for example, about 90°. Although the helix angle is set to about 90° in the present variation, this helix angle is an example and can be set to any angle. With this configuration as well, a similar effect to the one described above can be obtained.

Embodiment 2

Figure 14:
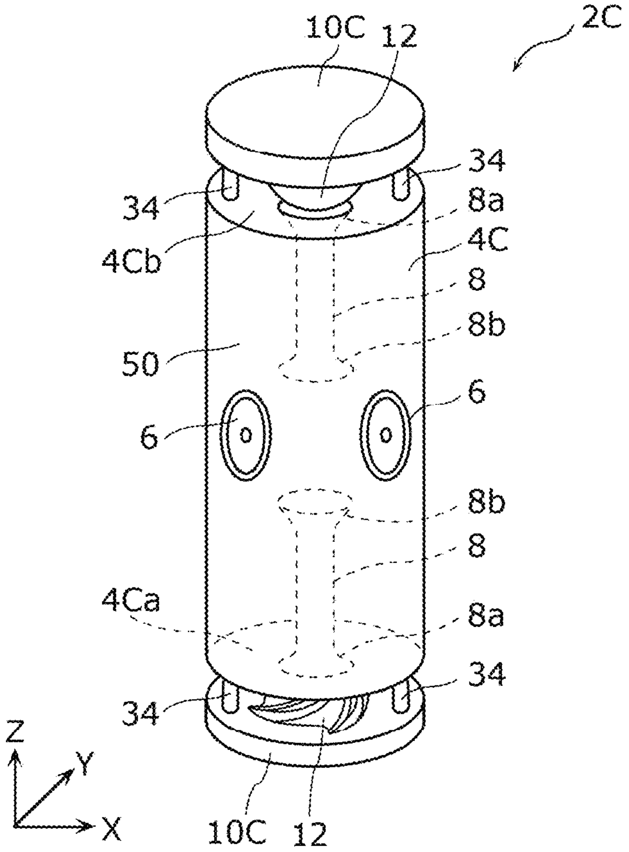
FIG. 14 is a perspective view illustrating a loudspeaker device according to Embodiment 2.

A configuration of loudspeaker device 2C according to Embodiment 2 will be described with reference to FIG. 14. FIG. 14 is a perspective view illustrating loudspeaker device 2C according to Embodiment 2. In the present embodiment, the same components as those in Embodiment 1 are denoted by the same reference numerals, and a description thereof will be omitted.

As illustrated in FIG. 14, loudspeaker device 2C includes cabinet 4C, a pair of loudspeaker units 6, a pair of bass reflex ports 8, a pair of support boards 10C, a pair of diffusers 12, and a pair of two column members 34.

Cabinet 4C is formed in the shape of a hollow cylinder and is disposed to cover the respective rear sides of the pair of loudspeaker units 6. An interior space (not illustrated) is formed inside cabinet 4C. The pair of loudspeaker units 6 are spaced apart in the circumferential direction on side surface 50 of cabinet 4C.

The pair of bass reflex ports 8 are spaced apart in the vertical direction in the interior space of cabinet 4. One end 8*a* of lower bass reflex port 8 is disposed in an opening (not illustrated) formed in bottom surface 4C*a* of cabinet 4C. Other end 8*b* of lower bass reflex port 8 is disposed in the interior space of cabinet 4C. That is, lower bass reflex port 8 extends upward (in the positive direction of the Z-axis) from the opening in bottom surface 4C*a* of cabinet 4C toward the interior space of cabinet 4C.

One end 8*a* of upper bass reflex port 8 is disposed in an opening (not illustrated) formed in top surface 4C*b* of cabinet 4C. Other end 8*b* of upper bass reflex port 8 is disposed in the interior space of cabinet 4C. That is, upper bass reflex port 8 extends downward (in the negative direction of the Z-axis) from the opening in top surface 4C*b* of cabinet 4C toward the interior space of cabinet 4C.

The pair of support boards 10C are formed in a circular plate shape and are arranged on the upper and lower sides of cabinet 4C. Lower support board 10C is disposed facing the lower surface (the surface opposite to the interior space) of bottom surface 4C*a* of cabinet 4C, and is connected to bottom surface 4C*a* of cabinet 4C via two column members 34. Upper support board 10C is disposed facing the upper surface (the surface opposite to the interior space) of top surface 4C*b* of cabinet 4C, and is connected to top surface 4C*b* of cabinet 4C via two column members 34. Although two column members 34 have been provided for each of the pair of support boards 10C in the present embodiment, the present invention is not limited thereto, and any number of column members 34 may be provided.

Lower diffuser 12 serves to control the flow of the air discharged from one end 8*a* of lower bass reflex port 8 to the exterior of cabinet 4C and the flow of the air drawn from the exterior of cabinet 4C to one end 8*a* of lower bass reflex port 8. Lower diffuser 12 is supported on the upper surface (the surface on the side facing bottom surface 4C*a*) of lower support board 10C. Upper diffuser 12 serves to control the flow of the air discharged from one end 8*a* of upper bass reflex port 8 to the exterior of cabinet 4C and the flow of the air drawn from the exterior of cabinet 4C to one end 8*a* of upper bass reflex port 8. Upper diffuser 12 is supported on the lower surface (the surface on the side facing top surface 4C*b*) of upper support board 10C.

In bass reflex loudspeaker device 2C described above, when bass is emitted from the rear side of each of the pair of loudspeaker units 6 to the interior space of cabinet 4C, bass with the same phase as that on the front sides of each of the pair of loudspeaker units 6 is emitted downward from one end 8*a* of lower bass reflex port 8 to the exterior of cabinet 4C due to Helmholtz resonance inside lower bass reflex port 8. Further, bass with the same phase as that on each of the front sides of the pair of loudspeaker units 6 is emitted upward from one end 8*a* of upper bass reflex port 8 to the exterior of cabinet 4C due to Helmholtz resonance inside upper bass reflex port 8. Thereby, the reproduction of the bass can be enhanced. In the present embodiment as well, a similar effect to that of Embodiment 1 can be obtained by using the pair of diffusers 12.

Other Variations, Etc.

As described above, each of the above embodiments has been described as an example of the technology disclosed in the present application. However, the technology of the present disclosure is not limited thereto, and may be applied to embodiments in which modifications, substitutions, additions, omissions, and the like are made as appropriate. It is also possible to combine the components described in the above embodiments to form a new embodiment.

Therefore, other embodiments will be exemplified below.

In Embodiment 1 above, down-firing bass reflex loudspeaker device 2 has been described, but the present invention is not limited thereto. For example, bass reflex port 8 may be disposed in front panel 14 of cabinet 4 or the like, diffuser 12 may be disposed facing one end 8*a* of bass reflex port 8, and bass may be emitted laterally from one end 8*a* of bass reflex port 8 to the exterior of cabinet 4.

In each of the above embodiments, side surface 42 of diffuser 12 (12A, 12B) has been formed into a substantially linear taper shape when viewed from the side, but the present invention is not limited thereto. For example, side surface 42 may be formed into any form of taper shape, such as a substantially parabolic taper shape or a substantially exponential taper shape.

As described above, each of the embodiments has been described as an example of the technology in the present disclosure. To this end, the accompanying drawings and the detailed description have been provided.

Accordingly, the components described in the accompanying drawings and the detailed description may include non-essential components for solving the problem, as well as essential components for solving the problem, to exemplify the technology described above. Therefore, the fact that these non-essential components are described in the accompanying drawings and the detailed description should not immediately lead to a finding that these non-essential components are essential.

In addition, since the embodiments described above are intended to exemplify the technology in the present disclosure, various modifications, substitutions, additions, omissions, and the like may be made within the scope of the claims or the equivalent scope thereof.

INDUSTRIAL APPLICABILITY

The loudspeaker device according to the present disclosure is applicable to, for example, a down-firing bass reflex loudspeaker device.

REFERENCE SIGNS LIST

2, 2C loudspeaker device
4, 4C cabinet
4C*a* bottom surface
4C*b* top surface
6 loudspeaker unit
8 bass reflex port
8*a* one end
8*b* other end
10, 10C support board
12, 12A, 12B diffuser
14 front panel
16 rear panel
18 right side panel
20 left side panel
22 top panel
24 bottom panel
26, 28 opening
30 interior space
32 diaphragm
34 column member pillar member
36 top
38 base edge
40 axis
42, 50 side surface
44, 44A, 44B groove
46, 48 vector

The invention claimed is:

1. A loudspeaker device comprising:

a loudspeaker unit that converts an electric signal into vibration to emit sound;

a cabinet that includes an opening and covers a rear side of the loudspeaker unit;

a bass reflex port in a tubular shape that communicates an interior of the cabinet with an exterior of the cabinet, and includes one end disposed in the opening of the cabinet and an other end disposed inside the cabinet; and a diffuser in a shape of a mountain that includes a side surface in a substantially tapered shape, a top facing the one end of the bass reflex port, and a base edge located on a side of the side surface that is opposite to the top in an inclination direction of the side surface, wherein the side surface of the diffuser includes a plurality of grooves that are spaced apart in a circumferential direction of the diffuser and each extend helically in a direction from the top to the base edge.

2. The loudspeaker device according to claim 1, wherein a width of each of the plurality of grooves gradually increases from the top to the base edge.

3. The loudspeaker device according to claim 1, wherein the plurality of grooves are arranged at regular intervals in the circumferential direction of the diffuser.

4. The loudspeaker device according to claim 1, wherein the top of the diffuser protrudes into an interior of the bass reflex port through the one end of the bass reflex port.

* * * * *